United States Patent

[11] 3,575,270

[72] Inventors: Heinrich Wagenfuhrer, Reinbek; Carl Thomas, Hamburg, Germany
[21] Appl. No.: 781,047
[22] Filed: Dec. 4, 1968
[45] Patented: Apr. 20, 1971
[73] Assignee: Jurid Werke G.m.b.H. Glinde, Reinbek, Germany
[32] Priority: Dec. 9, 1967
[33] Germany
[31] P 16 25 745.7

[54] FRICTION MEANS
2 Claims, 3 Drawing Figs.
[52] U.S. Cl. .................................................. 192/107, 192/30VD, 188/1B, 188/218A, 74/574
[51] Int. Cl. ............................................................ F16d 13/64
[50] Field of Search ........................................... 188/1 (B), 218 (A), 256; 192/(V.D.), 107, 105 (A); 74/574; 188/218, 264 (CC)

[56] References Cited
UNITED STATES PATENTS

| | | | |
|---|---|---|---|
| 1,990,882 | 2/1935 | Sargent | 188/264CC |
| 2,867,296 | 1/1959 | Requenes | 188/264CC |
| 2,265,340 | 12/1941 | Bond | 192/V.D. |
| 2,288,438 | 6/1942 | Dach | 188/1BX |
| 2,469,167 | 5/1949 | Little | 188/1BX |
| 2,512,438 | 6/1950 | Ranzi | 192/105AX |
| 2,869,700 | 1/1959 | Bowden | 188/1BX |
| 3,286,799 | 11/1966 | Shilton | 188/218A |
| 3,378,115 | 4/1968 | Stephens | 188/218A |

OTHER REFERENCES

German Printed Application, 1,202,154, Savrer 9-30-65, copy in Class 188/218

Primary Examiner—Benjamin W. Wyche
Attorney—Young & Thompson

ABSTRACT: A friction means such as e.g. a friction brake or a friction clutch is provided with a rotatable friction part against which friction elements are applicable for e.g. braking or clutching. Said friction part consists of a hollow body being of rotational configuration and having a hollow substantially closed chamber therewithin extending therearound, said chamber being filled with damping material.

PATENTED APR 20 1971
3,575,270
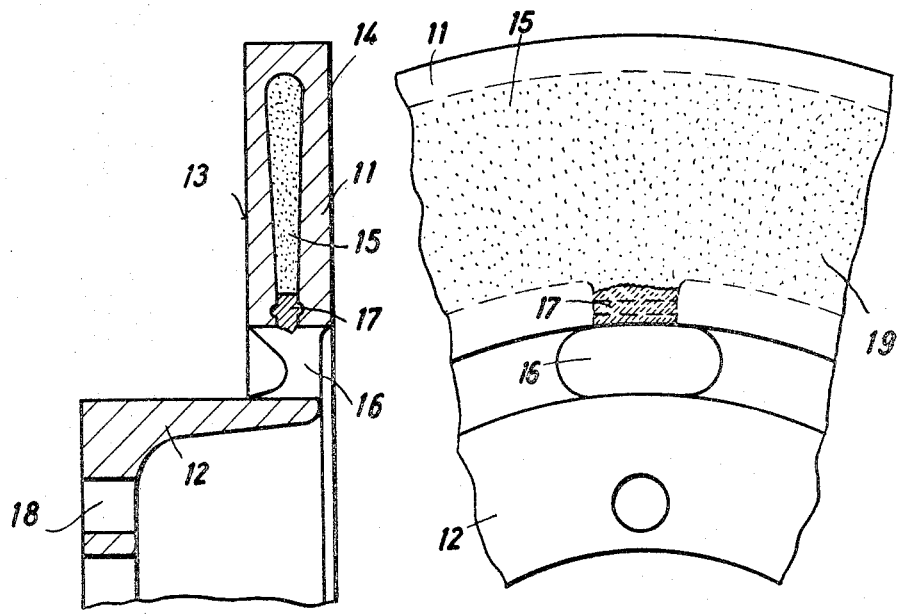
Fig.1
Fig.2
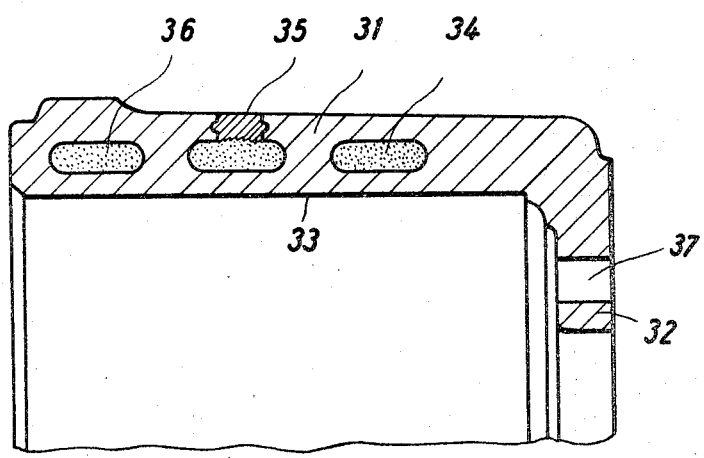
Fig.3
Inventors
HEINRICH WAGENFÜHRER
CARL THOMAS
By Young + Thompson
Attys.

FRICTION MEANS

The invention concerns friction discs or drums, particularly for use in friction brakes and clutches and having noise damping means.

On application of friction elements such as brake or clutch linings on such discs or drums, vibrations are set up which are thought to be caused by the alternating effects of holding and slipping. These vibrations are radiated from the disc or drum and often appear as unpleasant screaming noises.

An object of the invention is to provide means by which such noise radiations may be damped such that they are no longer perceptible.

It is already known that brake drums may be damped by lining the outer face opposite the friction surface with a damping material, for example asbestos which is secured by tension-bands. Furthermore it is also known to introduce such material into grooves on the annular front face of the drum.

In brake discs it is known that the noise may be damped by providing a groove in the outer peripheral surface of the disc and by filling this groove with a wire roll consisting of a series of individual wires. It is also known that with dished brake discs a filling of sand may be a disposed in the base of the part of the dish serving to secure the same. These features however did not achieve the desired result either because the damping was too slight or because the application of the material used for the damping was unequal to the mechanical stresses. A further object of the invention consequently consists in providing a damped friction disc or drum in which the damping medium is practically indifferent to mechanical stresses caused by expansion due to heat and high speeds, such that mechanical stresses do not adversely effect the noise damping means in action but wherever possible enhance the action.

According to the present invention there is provided a friction disc or drum, particularly for use in friction brakes or clutches, having a securing part connected to a shaft to be braked and a circular friction part for the application of friction elements and having means for damping noise including a damping material, characterized in that said friction part consists of a hollow body, obtained by casting, having a hollow chamber therewithin extending therearound said chamber being filled with damping material.

In this way a construction for dulling the noise is obtained in which any noise vibrations within the disc are immediately turned into friction heat. The outer shape of the constructional part remains substantially unaltered so that prior art parts may easily be replaced by parts according to the invention. In favorable embodiments the filler material used as damping material has an average grain size of between 0.01 and 0.5 mm. The filler material which consists advantageously of core sand or metal grains is so filled into the hollow space that it adjusts to the normal grain density.

Another advantageous possibility lies in arranging the filler as core material in the mould of the disc or drum obtained by casting and leaving it in the finished casting. The particles out of which the material is composed and the bonding agent are so constituted that, after the casting process, the filling material, after the disintegration of the bonding agent, is in the form of granular material. Such a core material may be produced in a favorable manner from oxides or carbides bonded with resin. The core material may also be produced in an advantageous manner in that coarse grained graphite is worked into a moulding in the shape of the hollow chamber according to the invention or in that metal powder of the desired grain size is sintered into such a shape. After completion of the drum or disc by casting, the cast body is then subjected to a further treatment in which the filling is turned into the granular form, for example by ultrasonic treatment or heat shock. Metals with high specific gravity are most suitable for damping material. A particularly advantageous shape of the hollow space according to the invention is obtained if the radial cross section thereof is wedge-shaped, the tapered part of the wedge being directed towards the joint between the friction part and the securing part.

Such a tapering of the cross section of the core is on the other hand associated with an enlarging of the cross section of the disc or drum so that for a larger flow of heat, larger cross sections are available and a more even distribution of temperature takes place. Embodiments of the invention are shown schematically by way of example only, in the accompanying drawings in which:

FIG. 1 shows a radial cross section in the axial direction through a part of a brake disc with noise damping means in accordance with the invention, the brake disc being a rotational body;

FIG. 2 shows a partial elevation of the brake disc shown in FIG. 1; and

FIG. 3 shows a radial cross section in the axial direction of a brake drum having noise damping means according to the invention, the brake drum being a rotational body.

The brake disc, part of which is shown in FIG. 1 includes a frictional part 11 which is to be embraced by the brake pads, and a dished part 12 which serves to secure the brake disc on the shaft to be braked. The frictional surfaces on the friction part 11 are marked 13 and 14.

A hollow chamber 15 is disposed in the friction part 11. The hollow chamber 15 has the configuration of a hollow annular space, and is so designed that, seen in the radial direction, its cross section tapers, the narrower part being disposed where the greater flow of heat is to be expected; in this case at the joint between friction part 11 and dished part 12.

The hollow chamber 15 is generally surrounded and closed against the outside, by the material of friction part 11. However several passages 16 are provided in the disc; these passages 16 extend from outside the disc to the hollow chamber 15. Plugs 17 are positioned in passages 16, and are intended to close off the hollow space 15. Holes 18 which receive bolts for securing the disc on the shaft are also provided in the disc.

On production of a brake disc with the noise damping device according to the invention it is possible to proceed in that either a core creating the hollow chamber 15 is removed from the disc and replaced by suitable filler material 19, or that from the start the core has a specific composition such that at the completion of the casting process, the core is present in the desired granular state or is brought into the desired state by additional measures.

Referring now to FIG. 3 there is provided a brake drum having a friction part 31 and a flange part 32. A friction surface 33, against which upon braking, the brake linings (not shown) are applied, is located on the inner side of the friction part 31. Hollow chambers 34 are provided in the friction part 31. Each hollow chamber 34 has the configuration of a hollow annular space which is generally surrounded, and closed against the outside, by the material of friction part 31. Closure plugs 35 are inserted in the holes which are necessary as drawoff holes for casting as shown. Normally, about three holes are provided for each chamber 34. Filling material is shown at 36 and securing holes are marked 37. Suitable filling materials consists in the most simple case of sand, for example core sand, which after completion of the casting process is in any case present in the piece cast.

Use of other filling material depends upon economy in the production of the disc or drum and may also be chosen in consideration of the natural frequency of the disc or the drum. Successful damping may be obtained e.g. by filling the hollow chambers with a lead alloy, which if desired can be arranged to become fluid at given operational temperatures of the brake.

Cores as a filling for the hollow chambers may also be produced as mouldings, whose bonding during the casting of the disc disaggregates to such an extent that the mouldings disintegrate to mutually movable particles.

We claim:

1. A friction disc or drum particularly for use in friction brakes or clutches, having a securing part connected to a shaft to be braked and a circular friction part for the application of friction elements and having means for damping noise including a damping material, characterized in that said friction part consists of a hollow cast metal body having a hollow annular chamber therewithin extending continuously therearound, said chamber being filled with a particulate damping material consisting of metallic sinter material which can be turned into granular form.

2. A friction disc or drum particularly for use in friction brakes or clutches, having a securing part connected to a shaft to be braked and a circular friction part for the application of friction elements and having means for damping noise including a damping material, characterized in that said friction part consists of a hollow cast metal body having a hollow annular chamber therewithin extending continuously therearound, said chamber being filled with a particulate damping material, the radial cross section of the hollow chamber being of wedge shape, the tapered end of the wedge being adjacent the joint between the friction part to the securing part.